United States Patent [19]

Schoenhard

[11] 4,306,519
[45] Dec. 22, 1981

[54] AIR HUMIDITY DEVICE FOR INTERNAL COMBUSTION ENGINE

[76] Inventor: James D. Schoenhard, 104 West Knox St., Morrison, Ill. 61270

[21] Appl. No.: 70,573

[22] Filed: Aug. 29, 1979

[51] Int. Cl.³ .................. F02M 17/06; B01F 3/04
[52] U.S. Cl. ........................... 123/25 R; 123/25 A; 123/25 E; 123/25 G; 123/198 A; 123/524; 261/18 A
[58] Field of Search ............... 123/25 A, 25 G, 25 E, 123/198 A, 523, 524, 25 R; 261/18 A

[56] References Cited

U.S. PATENT DOCUMENTS

| | | | |
|---|---|---|---|
| 1,297,598 | 3/1919 | Shawvan | 123/25 G |
| 1,336,592 | 4/1920 | Sibbald | 123/25 G |
| 1,398,459 | 11/1921 | Hemenway | 123/25 G |
| 1,462,767 | 7/1923 | Putnam | 123/25 G |
| 1,551,511 | 8/1925 | Futcher | 123/25 G |
| 1,854,607 | 4/1932 | Andrews | 123/25 G |
| 1,890,107 | 12/1932 | Bowman | 123/25 G |
| 3,749,376 | 7/1973 | Alm | 123/25 E |

*Primary Examiner*—Wendell E. Burns
*Attorney, Agent, or Firm*—Cook, Wetzel & Egan, Ltd.

[57] ABSTRACT

A vaporizer cooperating with a recirculating water system humidifies air before it enters the carburetor of an automobile engine. The vaporizer is generally a hollow tube which includes an evaporating pad that distributes liquid such as water. As air moves through the vaporizer, vapor moves into the air stream. Excess liquid is collected at the bottom of a larger portion of the vaporizer, whose air outlet is elevated from that bottom to prevent liquid phase water from leaving the vaporizer. The recirculating system drains collected excess water.

4 Claims, 4 Drawing Figures

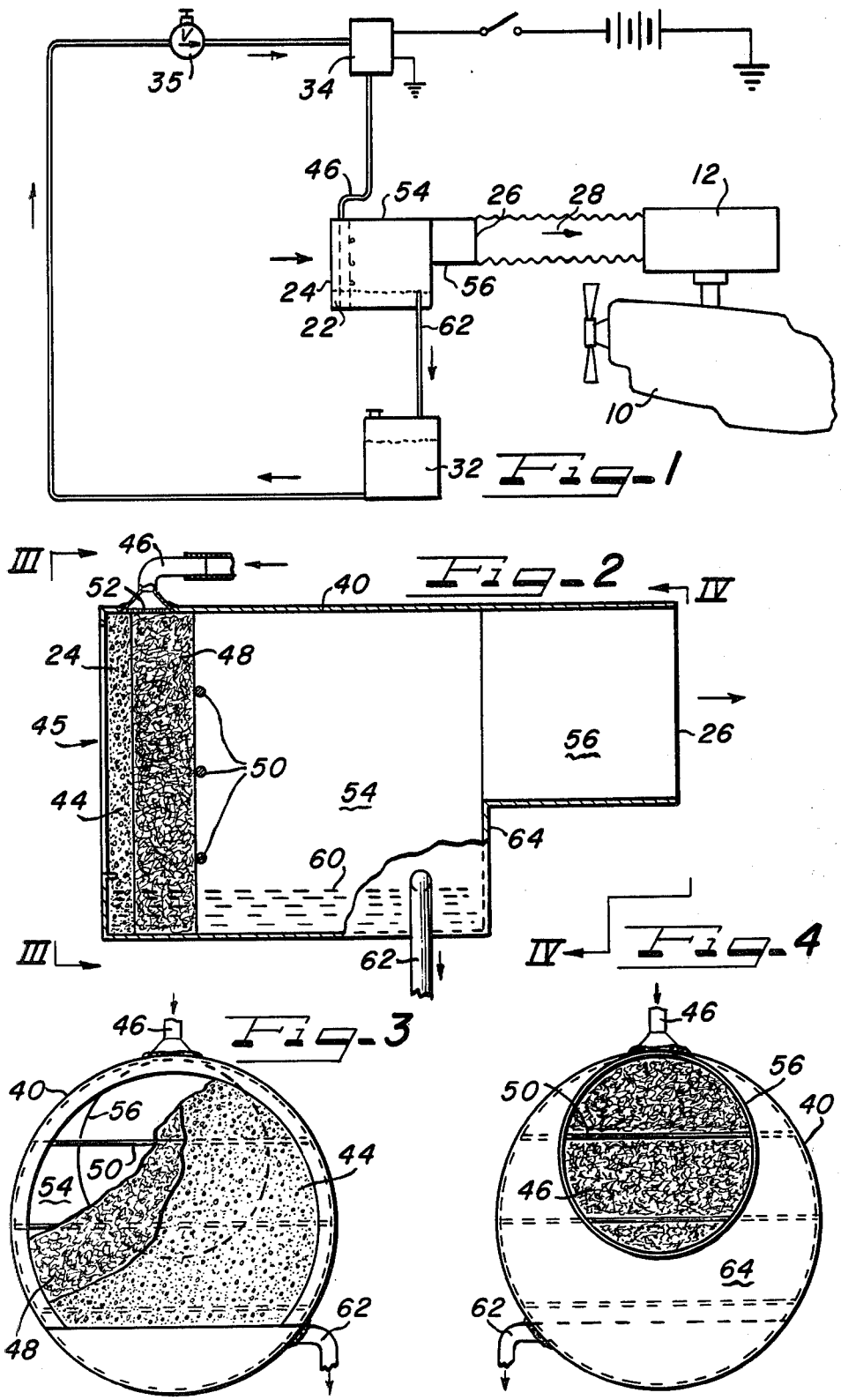

AIR HUMIDITY DEVICE FOR INTERNAL COMBUSTION ENGINE

The present invention relates to efficiency improvements in internal combustion engines by controlling the fuel/air supply thereto.

A broad movement is under way to increase the efficiency with which energy and fuels are used, particularly with respect to internal combustion engines used for public and private transportation. It is known that the introduction of water, in some appropriate manner, to the fuel-air mixture increases the energy developed by combustion. However, it has been a problem to find a reliable method or apparatus for such introduction of water. The spraying of water through nozzles into the manifold of an engine has been found not to be satisfactory without complex control equipment.

It is therefore an object of the present invention to provide a device for increasing the fuel efficiency of an internal combustion engine by humidifying the incoming air.

It is a further object to provide such a device which is simple, compact, easy to install, and relatively inexpensive.

A further object is to provide a device to introduce vapor of water or other appropriate liquid additives to the combustion zone of an engine.

According to the present invention, an internal combustion engine is equipped with a device which introduces a substance in vapor form into the air intake of the engine. In an illustrative embodiment, air is drawn into a gasoline engine through the standard carburetor and air cleaner via a vaporizer. The vaporizer is connected to a recirculating liquid supply. A wick or porous pad comprising, for instance, sponge and fiberglass layers is fitted across the vaporizer passage and saturated with liquid from the recirculating system. Air is drawn through the wick or pad as is required by the engine and draws off the liquid as vapor. The air/vapor mixture is drawn into the engine and passes through the carburetor and is mixed with fuel to be drawn into the cylinders of the engine. When the air/vapor fuel mixture ignites, the vapor increases power, thereby improving fuel economy. When water is used, one gallon of water is typically vaporized for each nine gallons of gasoline used. Fuel mileage in a V-8 automobile is improved by two to five miles per gallon of fuel by use of such system.

FIG. 1 of the drawings is a schematic diagram of a vaporizer and liquid additive recirculating system according to the present situation;

FIG. 2 is a side view with parts broken away of the vaporizer schematically shown in FIG. 1;

FIG. 3 is a view taken along the lines III—III of FIG. 2, with parts broken away; and FIG. 4 is a view taken along the line IV—IV of FIG. 2, with parts broken away.

Referring to FIG. 1, a typical gasoline fueled internal combustion engine generally represented at 10 includes a carburetor about which, in most American cars, is fitted an air cleaner 12 in a housing which usually includes a tubular intake part. An air humidity device generally shown at 20 includes a vaporizer 22 having an air inlet 24 at one side and an air and vapor outlet 26 at an opposing side. Outlet 26 communicates, in the embodiment shown, to the intake of an air cleaner 12 by means such as a flexible connector or hose 28 of appropriate dimensions. Of course, the vaporizer 22 may also advantageously be placed between the air cleaner 12 and the carburetor of the engine 10, to work only with cleaned air. Thus vaporizer 22 is connected to engine 10 in such a manner that all air passing into the engine first passes through vaporizer 22.

Vaporized liquid such as water is provided to vaporizer 22 by a recirculating system 30 which includes a recovery tank 32 from which liquid is drawn by a suitable pump 34 such as an ordinary automotive fuel pump. A valve 35 regulates the liquid volume pumped. The liquid is provided thereby to means such as an evaporative pad arrangement 45 within vaporizer 22 for vaporizing the liquid such that the vapor is drawn by air passing through air inlet 24 into the engine 10.

Referring to FIG. 2, the evaporative pad arrangement 45 is located at the air inlet end 24 of vaporizer 22 and, in this embodiment, includes a layer of common synthetic sponge 44 which distributes liquid pumped by pump 34 through inlet 46 to vaporizer 22. A fiberglass layer 48 made, for instance, of a fiberglass filter element such as is commonly used for air filtration for home furnaces is positioned adjacent the sponge layer 44. Any other suitable materials may be used in one or more layers. One-half inch of sponge and one inch of fiberglass has been preferred, but equal thicknesses of materials have also been used successfully. A set of retainer bars 50 extending transversely within vaporizer 22 supports the evaporative pad arrangement 45.

The outer or intake side of the pad 45 is supported by one or more end walls or rims of the vaporizer housing. A permeable screen or bulkhead may be used between layers 44 and 48 for further support of the pad 45, but has not usually proven necessary.

Liquid provided through inlet 46 may be spread by a baffle 52 to wet the upper regions of the pad 45, including sponge layer 44 and fiberglass layer 48, more uniformly. The liquid is drawn substantially throughout the entire sponge layer 44. The liquid is vaporized as air moves transversely through the pad 45 so that humidified air is used in the fuel-air mixture of the engine.

According to another facet of the invention, excess liquid is restrained from entering the engine 10 by constructing vaporizer 22 in larger and smaller conduit portions, 54 and 56 respectively. The evaporative pad arrangement is located in the larger portion 54; any excess liquid 60 which is not vaporized in its initial pass through the evaporative pad 45, collects at the bottom of the larger portion 54. The air outlet end 26 of vaporizer 22 comprises the smaller portion 56 which is relatively oriented with respect to the larger portion 54 so that excess water 60 collecting at the base of portion 54 does not enter portion 56. Excess liquid 60 leaves the larger portion 56 through an outlet 62 connected to supply tank 32 by a hose or pipe, for example.

Good results have been obtained using a vaporizer 22 having its larger portion 54 made from a five inch hollow cylinder and its smaller portion 56 made of a three inch hollow cylinder, the larger and smaller portions being joined by a suitable wall 64. A typical fuel pump has been found to operate satisfactorily as the water pump 34. A two-gallon plastic container works as well as a tank 32 for a water supply. Rubber hose of one-fourth inch diameter can be used for the several connections among vaporizer 22, tank 32 and pump 34. The liquid inlet 46 and outlet 62 of vaporizer 22 are fashioned of one-fourth inch copper tubing brazed to vaporizer conduit walls.

It has been found that the illustrated embodiment, when retrofitted on a typical American automobile, uses about one gallon of water for each nine gallons of gasoline consumed. Fuel economy was increased by about two to five miles per gallon.

It will be understood that the foregoing embodiment has been described as introducing water vapor to the air flowing into the air cleaner 12 or carburetor of the engine 10. Other liquid substances such as alcohol can alternatively be used. Other modifications within the scope of the present invention will occur to those who are skilled in the art.

I claim:

1. An apparatus for improving the fuel efficiency of an internal combustion engine by adding the vapor of a liquid to the air intake thereof, the apparatus comprising:

a reservoir containing said liquid;

a vaporizer shell having a fluid inlet at a top portion thereof and an air inlet at a front side thereof, an air passage therethrough, and an air/vapor outlet opposite the air inlet, the fluid inlet communicating to a fluid drain adjacent a bottom portion of the vaporizer shell, and the air/vapor outlet communicating to an air inlet of the engine;

an evaporative pad positioned in said vaporizer shell entirely across the air passage beneath the fluid inlet and between the air inlet and air/vapor outlet of the vaporizer and extending into a pool of said liquid collected in the bottom of the vaporizer shell to absorb and hold said liquid passed from the fluid inlet into the vaporizer shell; and flow urging, regulating, and passage means for passing said liquid from the reservoir to the fluid inlet at a selected rate.

2. The apparatus of claim 1, wherein the liquid is at least part water.

3. The apparatus of claim 1, wherein the liquid is at least part alcohol.

4. An apparatus for adding the vapor of a liquid substance to air to be mixed with a primary fuel and used in an internal combustion engine, the apparatus comprising:

a reservoir containing said substance in a liquid state;

a vaporizing having a fluid inlet communicating with said reservoir, an air inlet, an air/vapor outlet communicating to a carburetor of said engine, and an air flow path through said vaporizer;

evaporative pad means comprising at least in part a spongeous substance and having a thickness dimension in the direction of air flow which is less than dimensions of height and width of said pad means normal to said air flow, the pad means being positioned in said vaporizer across said air flow path and having a vertically top portion; and means directing said liquid substance to said top portion of said evaporative pad means; and wherein said vaporizer comprises intercommunicating larger- and smaller-cross section portions, the larger portion holding the evaporative pad means and also having a lower portion closed at its bottom and sides to collect excess liquid substance passed through the fluid inlet and pad means and not absorbed by said air as vapor and to partially immerse the pad means in said liquid substance, whereby at least a portion of said substance will be vaporized and carried off by air flowing through said vaporizer to said engine for use in the combustion in said engine and to increase the fuel efficiency of said engine.

* * * * *